(12) United States Patent
Rossmann

(10) Patent No.: US 7,689,558 B2
(45) Date of Patent: Mar. 30, 2010

(54) APPLICATION MONITORING USING PROFILE POINTS

(75) Inventor: Paul Albert Rossmann, Wiesloch (DE)

(73) Assignee: SAP AG, Walldorf (DE)

( * ) Notice: Subject to any disclaimer, the term of this patent is extended or adjusted under 35 U.S.C. 154(b) by 312 days.

(21) Appl. No.: 11/222,873

(22) Filed: Sep. 9, 2005

(65) Prior Publication Data

US 2007/0074170 A1   Mar. 29, 2007

(51) Int. Cl.
*G06F 17/30* (2006.01)
(52) U.S. Cl. .......................... 707/6; 717/130; 717/128; 717/127; 707/104.1
(58) Field of Classification Search ...................... 707/6, 707/104.1; 717/154, 130, 124; 710/1
See application file for complete search history.

(56) References Cited

U.S. PATENT DOCUMENTS

| | | | |
|---|---|---|---|
| 6,429,860 B1 * | 8/2002 | Hughes | 345/418 |
| 6,513,155 B1 * | 1/2003 | Alexander et al. | 717/124 |
| 6,553,564 B1 * | 4/2003 | Alexander et al. | 717/128 |
| 6,560,773 B1 * | 5/2003 | Alexander et al. | 717/128 |
| 6,643,842 B2 * | 11/2003 | Angel et al. | 717/130 |
| 6,662,362 B1 * | 12/2003 | Arora et al. | 717/154 |
| 6,678,883 B1 * | 1/2004 | Berry et al. | 717/128 |
| 6,968,540 B2 | 11/2005 | Beck et al. | |
| 7,093,234 B2 | 8/2006 | Jason et al. | |
| 7,114,150 B2 * | 9/2006 | Dimpsey et al. | 717/131 |
| 7,137,110 B1 | 11/2006 | Reese et al. | |
| 7,143,394 B1 | 11/2006 | Shadmon et al. | |
| 7,178,131 B2 | 2/2007 | Mitchell et al. | |
| 7,185,367 B2 | 2/2007 | Munson | |
| 7,194,732 B2 | 3/2007 | Fisher et al. | |
| 7,240,335 B2 | 7/2007 | Angel et al. | |
| 7,251,810 B1 * | 7/2007 | Nolte | 717/130 |
| 7,305,663 B1 * | 12/2007 | McGuire et al. | 717/130 |
| 7,313,661 B1 * | 12/2007 | Dmitriev | 711/159 |
| 7,398,369 B2 * | 7/2008 | Dickenson | 711/170 |
| 7,424,589 B1 * | 9/2008 | Pliss et al. | 711/170 |
| 2001/0047510 A1 * | 11/2001 | Angel et al. | 717/4 |
| 2004/0163077 A1 * | 8/2004 | Dimpsey et al. | 717/130 |
| 2005/0071516 A1 * | 3/2005 | Levine et al. | 710/1 |
| 2006/0059146 A1 * | 3/2006 | McAllister et al. | 707/6 |
| 2006/0129601 A1 * | 6/2006 | Chang et al. | 707/104.1 |
| 2006/0195823 A1 * | 8/2006 | Bentolila | 717/127 |

OTHER PUBLICATIONS

John Panzer, Automatic Code Instrumentation, Jan. 1999, pp. 1-7.*
Lesson: Overview of the JNI—3 pages, Jun. 25, 2005.
Java Virtual Machine Profiler Interface (JVMPI)—41 pages, Jun. 25, 2005.

(Continued)

*Primary Examiner*—Luke S. Wassum
*Assistant Examiner*—Sherief Badawi
(74) *Attorney, Agent, or Firm*—Blakely Sokoloff Taylor & Zafman LLP

(57) ABSTRACT

A system and method for application monitoring using profile points. An embodiment of a method includes installing an agent in a computer application. The agent will generate an event when there is an entry into a method or when there is an exit from a method. The method further includes running the computer application is run, and monitoring for events that are generated by the agent during the running of the computer application.

18 Claims, 6 Drawing Sheets

OTHER PUBLICATIONS

Jave Virtual Machine Debug Interface Reference—69 pages, Jul. 14, 2005.

David J. Lilja 2003—Ch 6 Measurement—www.arctic.umn.edu/perf-book/slides/ch6-measurement.ppt, 2003.

Lesson: Overview of the JNI—Pages http://java.sun.com/docs/books/tutorial/mativel.1/concepts/index.html, Jun. 25, 2005.

Java Virtual Machine Profiler Interface (JVMPI) 41 Pages—http://java.sun.com/j2se/1.3/docs/guide/jvmpi/jvmpi.html, Jun. 25, 2005.

Java Virtual Machine Debug Interface Regerences—69 Pages—http://java.sun.com/j2se/1.4.2/docs/guide/jpda/jvmdi-spec.html, Jul. 14, 2005.

Java Vertual Machine Profiler Interface (JVMPI)—42 Pages—http://java.sun.com/j2se/1.4.2/docs/guide/jvmpi/jvmpi.html, Jul. 14, 2005.

* cited by examiner

APPLICATION MONITORING USING PROFILE POINTS

TECHNICAL FIELD

Embodiments of the invention generally relate to the field of computer application development and, more particularly, to a system and method for application monitoring using profile points.

BACKGROUND

In the operations of a computer system, it may be necessary to monitor, profile, trace, and debug applications. Such processes are necessary to develop computer applications, as well as to modify and maintain the applications. A computer application may be stored on a computer-readable medium.

Certain processes and tools are known for application development. In one example, certain languages, such as Java™, provides interfaces to attach agents for application monitoring. Such agents may provide for various different analysis functions. However, a major problem with such interface operations is that poor performance may result once an agent is activated. For this reason, such agents are not normally usable in a productive system, and thus are of limited use in the analysis of an application if actual operating conditions are required.

As an alternative, a developer may modify the code for analysis, such as by adding instrumentation either by source code modification, or, at a higher level, by byte code modification. These processes also have drawbacks. Such processes are inflexible and difficult to modify as needed. For example, any source code modifications will require recompilation if any changes are made or the instrumentation needs to be removed from the application, and the instrumentation generally cannot be added to unknown types of applications. Further, adequate performance of a system is not assured because these processes may still have significant impacts on operations. In one example, it may not be possible to anticipate whether added instrumentation will fall inside a frequently used application loop. Thus, the overall impact of such instrumentation on performance or output volume of an application under test may be unpredictable.

SUMMARY OF THE INVENTION

A system and method for application monitoring using profile points are described.

According to a first embodiment of the invention, a method includes installing an agent in a computer application, wherein the agent generates an event when there is an entry into a method or when there is an exit from a method; running the computer application; and monitoring for events that are generated by the agent during the running of the computer application.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
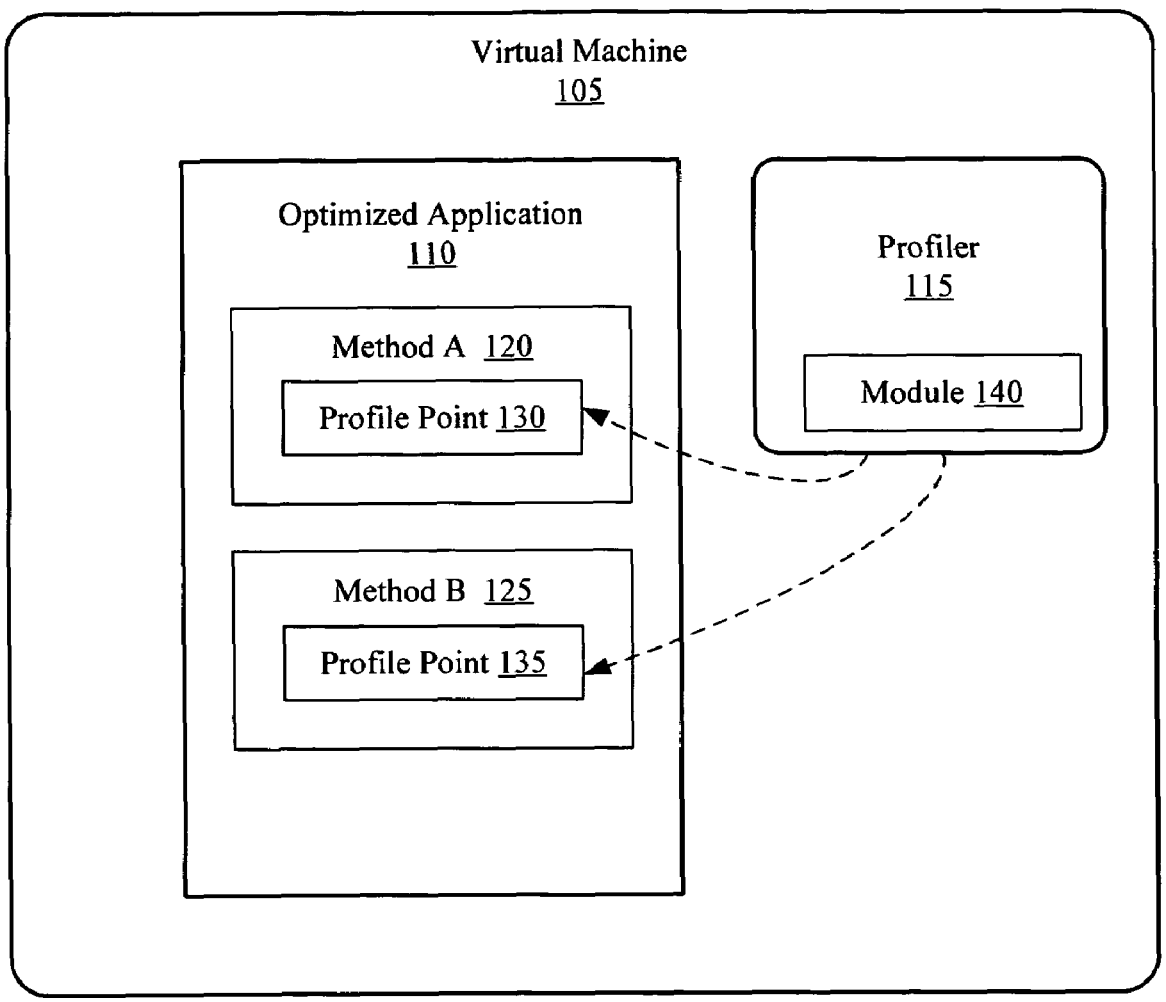
FIG. 1 is an illustration of an embodiment of profiling using profile points.

Embodiments of the invention are generally directed to a system and method for application monitoring using profile points.

In the process of analyzing computer application performance, a difficulty that is often faced is developing processes that will allow for tracing and capturing data regarding system performance effectively, while minimizing the impact of the analysis operation itself on system performance. If analysis methods are not sufficiently transparent, then the application is not viewed in a true runtime process, which may make it difficult to pinpoint the source of certain problems. If an application problem involves excessive time or memory use, finding the source of this problem is difficult when the analysis process is adding significantly either to system delay or to memory consumption.

Excessive memory consumption is a problem in many computer applications, and particularly in Java programs. The amount of memory that a Java application can allocate is generally not limited, and thus an application can disrupt operation by allocating all available memory for the virtual machine. An embodiment of the invention allows an application to continue operation as long as possible in testing before causing failure because of excessive memory allocation, and thus can allow a better evaluation of the sources of the problem than conventional processes.

In an embodiment of the invention, a profiler uses a profiler agent or marker to generate events regarding a method of a computer application. In an embodiment of the invention, the events specifically include method enter and method exit events. The profiler places the agent in the method of the application, and the agent generates an event whenever the method is entered or exited.

An embodiment of a profiler may be used to trace back performance problems to the source. By evaluating data regarding method entry and exit events, the time usage of an application can be broken down. For example, a method that utilizes a high amount of CPU (central processing unit) time and a high amount of elapsed time may indicate a complex computation that is working properly, but a high amount of elapsed time and a lower value of CPU time is an indication of high latency. The execution time for a method is calculated by subtracting the time of entry from the time of exit for the method. Between the time of entry and the time of exit the time a thread is in a running state may also recorded, with such time being the CPU time, which reflects the true processing time of a method. A thread may be running (actually executing instructions on the CPU), waiting (waiting for a signal from the operating system, or ready (waiting for the scheduler to gain CPU time). For calculation, each method inherits the execution time from each method it calls, providing total time of execution for a method processing.

In one embodiment of the invention, a method or module inserts a profiling marker or agent into an application, with the inserted marker or agent providing notification regarding method entry and exit. The installed object or process may be referred to as a "profile point" herein. In conventional operations, a break point is a marker that is placed in a program to direct a debugger to stop the program whenever execution reaches that point. For example, a break point may be placed on a line of code because of a belief that the relevant portion of the code is creating a program failure. In this example, the break point will cause the program to stop prior to execution of the code in question, whereby allowing a developer to evaluate the current status, including checking the contents of variables and viewing operations such as a call stack, and then to run the code to see how it operates under these circumstances. In a conventional operation, the process of setting a break point for a method will require that the code be de-optimized, which is a complex and time consuming task. In contrast, an embodiment of the invention utilizes a profile point that is non-blocking in operation and that works by providing events or notices regarding the entering and exiting of methods. In an embodiment, the profiler may assist in application monitoring and profiling, and may be used in processes such as automated server life cycle management.

In an embodiment of the invention, an application profiler uses profile points to provide memory profiling and performance monitoring. In an embodiment of the invention, the profiler uses method entry and exit events to measure and compare CPU time and elapsed time for each method, which information may then be used to find any delay in response. Further, the profiler may use information gained from profiling to analyze trouble areas or "hot spots" by, for example accessing or dumping a call memory stack for the most expensive (most resource intensive) method execution contexts, and thus to identify the entry to the most expensive execution in a complex request or operation. The profiler further allows for tracing of operations by following method entry and exit operations to trace application operations and determine what the application is doing dynamically, which may be also assist in locating problem areas in an application.

In an embodiment of the invention, context information obtained from profiling may allow a programmer to choose the level of optimization that is needed for a computer application. In one example, a sorting algorithm in a computer application may be subject to optimization. In this example, a developer may have the option of altering the sorting method used or altering the implementation of the compare function for best performance. Data gained by the implementation of profile points may be used to help determine where the source of a performance problem lies and thus can assist is choosing which mode of optimization will best improve performance.

In an embodiment of the invention, profile points may be used either as an alternative to or supplement to other profiling methodologies, such as source code instrumentation and byte code modification. Profile points may be used to increase the effectiveness of profiling and enable a developer to view system performance in a more normal runtime environment with less impact on system operations than conventional methods and tools. Compared to conventional techniques, profile points generate fewer interrupt events and therefore reduce the impact on performance of the monitored application.

In an embodiment of the invention, a profiler may begin monitoring when a server signals or provides notification that a problem in operation exists. The problem might be an issue such as unusually high memory consumption or unusually high response times. In an embodiment, the server may be allowed to run for analysis largely without modification from the original or baseline configuration because the profile points have minimal effect on application operation. For this reason, a server may be allowed to continue to operate as long as possible to allow for effective profile processes. In contrast, if a server is reaching its operational limits, then a conventional process including the redefinition of byte code for a set of classes for analysis may then push the server past its limits and thus the operation of the application may not survive long enough to obtain monitoring results.

Conventional profiling processes have limitations in monitoring operations. For example, source code instrumentation is a process of installing monitoring instrumentation code into the source code, with the instrumentation providing for profiling functions. The source code is the program instructions, often written as a text file, that generally are translated by a compiler, interpreter, or assembler into the object code for a particular computer before execution. Among other problems, source code instrumentation generally requires that the translation or compilation of the code be repeated whenever any change is made to the instrumentation.

Byte code also suffers from significant limitations and uncertain impact on operations. Byte code modification is a process of instrumenting the "byte code" of an application, and such process also has limitations in profiling processes. In certain environments, including Java, byte code is an intermediate code that is intended to be transferable between different types of processes. Byte code is computer object code that is processed by a program, usually referred to as a "virtual machine", rather than by the actual computer machine, the hardware processor. In an embodiment of the invention, setting and disabling profile points is more simple and less error prone than conventional byte code instrumentation techniques. In profiling operations, setting and disabling profile points generally will be faster and easier than redefining classes during runtime after a byte code modification. Further, at the level of operation of the profiler, an error is difficult to locate without a source, which may be difficult to discern with byte code modification. In contrast, a profile point event will occur in a well-defined portion of a native program, thereby allowing easier location of problems.

An embodiment of the invention may be implemented in an environment that includes, but it not limited to, a Java environment. In a Java embodiment, an embodiment of the invention is implemented in one or more interfaces. For example, a profiler may work simultaneously in the JVMPI (Java virtual machine profiler interface) and JVMDI (Java virtual machine debug interface). The profiler may be expanded to include other interfaces, including, but not limited to, the JVMTI (Java virtual machine tool interface). The JVMPI is a two-way function call interface between the Java virtual machine and an in-process profiler agent, in which the virtual machine notifies the profiler agent of various events and the profiler agent issues controls and requests for more information through the JVMPI. The JVMDI is a programming interface used by debuggers and other programming tools, and provides a way both to inspect the state and to control the execution of applications running in the Java virtual machine. The JVMTI is a more recent native programming interface for use by tools, which provides both a way to inspect the state and to control the execution of applications running in the Java virtual machine. JVMTI is intended to replace the JVMPI and JVMDI, and was designed to work with the Java Native Interface (JNI). Java debug wire protocol (JDWP) then is a protocol for communication between a debugger and a Java virtual machine. In an embodiment of the invention, it is possible to set profile points in the <init> (initialization) method of specific objects for the purpose of watching object generation and therefore memory allocation. Such an approach may be used to make the profiler concept compliant to JVMTI in connection with Java processes.

In one embodiment, the profiler is installed as a DLL (dynamic link library). The DLL may be installed in a root directory, which is where the Java virtual machine would be called. The profiler is embedded into the virtual machine. The profiler may include a user console, including a command line interface or more elaborate user interface.

In one embodiment of the invention, profile points are inserted into the methods of an application during compilation of byte code. With the profile points inserted, it is possible to profile the operation of the application without other code modification. In this process, it is possible to obtain values for core parameters and use such information to investigate how operations are proceeding. Because there is no need to stop data flow, it is possible to more accurately follow the relevant data flow of an application. For example, this profiling process will provide notice when a string in an application is allocated. If the location of string allocation is known, then it is possible to trace the problems related to the string in the application. The profile points make it possible to determine who is calling problem methods, how many sessions are active in the virtual machine, and what kind of objects are generating the problem.

In an embodiment of the invention, a profiler allows for the combination of traditional functions of a tracer, a profiler, a monitor, and a debugger in a single tool (which functions may generally be referred to as "profiling" herein). The profiler is intended to operate efficiently with a minimum of disruption, with the profiler using only a limited subset of the interfaces to minimize the number of callback events. In an embodiment of the invention, the profiler is able to analyze unknown applications, adapt the monitor and profiler settings during runtime, and run the tool in a productive system in which there are high performance requirements. This integration of processes is possible because of the usage of a profile point as a generator for method enter and exit events; a generator for context enter and exit events; a generator for object allocation events; and a generator for context information based on runtime values. This integration allows a profiler user to track memory problems back to the source code location, and thus back to the location where the objects were allocated.

In an embodiment of the invention, a profiler can handle profile point events to adapt to the granularity of the measurement automatically and to change contexts on the fly even if the server is under load. In this manner, the profiler can provide for automatic hotspot detection for memory and performance. In an embodiment of the invention, a profile point placed in an application is easily maintainable, and it is possible to adapt the configuration to the monitored application. A profile point thus provides flexibility resembling a profile interface, while providing speed that resembles source code instrumentation or byte code modifications. A profile point may be utilized to behave like a break point in many ways, but provides additional advantages, including accepting optimized code in operation. This is in contrast with setting a break point in a conventional process, which would require that code be de-optimized in order to set the break point.

In embodiments of the invention, the collection of data from profile points may be adjusted as needed. In an embodiment of the invention, data may be logged continually from an always on agent, but the logging can also be switched on or off as needed, thus avoiding the collection of too much data. In an embodiment of the invention, if too much data is generated from profiling, then the profile point can be deselected as needed. In a conventional profiler in a computer environment such as a Java system, it is generally necessary to reload a class or make similar changes to institute changes in data collection, but this is not necessary for a profiler in an embodiment of the invention because profile points can be switched on and off, thereby providing a simple method of adjusting the flow of collected data.

In one embodiment, a profiler may be used in extremely large applications that have many method calls, object allocations, and classes, and thus require a premium on performance. In one particular example, a profiler may be implemented in connection with the SAP-Portal of SAP AG, which may include 300,000,000 method calls, 50,000,000 object allocations, 10,000 loaded classes, and 90,000 methods at start up. The simplicity of set up and modification of an embodiment of a profiler may assist such large process. However, use of a profiler is not limited to this type or size of program or system. An embodiment of a profile may be used with multiple types of programs, including any Java program.

During compilation of a Java application, a debug table is generated. Under an embodiment of the invention, a profiler works in conjunction with the existing debug table. In an embodiment of the invention, a module or table is structured to determine when and where to place profile points using, at least in part, the debug table. Under an embodiment of the invention, a profiler may obtain parameters from the debug table as needed to assist in identifying application problems. The results from profiling provide the values needed for application analysis. In evaluating the profiling results, the pattern of a core graph may be analyzed by doing a pattern search.

In an embodiment of the invention, profiles of an application performance may be provided with minimal disruption of runtime. In one embodiment, the implementation of profile points means that no operation (NOP) instructions may be placed in code instead of interrupts, which are required for conventional processes. In this way, the profile may collect information to follow the data flaw in a system without stopping application operation. In an embodiment of the invention, interrupts are reduced, which aids in operation because interrupts are very expensive in terms of system performance. Interrupts are expensive in overhead, and the reduction of interrupts improves performance. An embodiment of the invention allows a developer to obtain values for core parameters.

Profile points may provide additional benefits in operations. In one embodiment of the invention, profile points may be used as an efficient method to generate multi-purpose interrupts in a Java application. In one embodiment of the invention, a profiler agent can replace any method by a method with the same signature of the same class. In this embodiment, the profiler agent provides an alternative to aspect programming and allows simplification of the setup of a test- or developer framework.

FIG. 1 is an illustration of an embodiment of profiling using profile points. In this illustration, a process includes a virtual machine 105, which may be a Java virtual machine. The virtual machine 105 has received an optimized application 110. In the running of the application 110 by the 105, a need for profiling, monitoring, or a similar process may arise. In an embodiment of the invention, a profiler 115 provides profiling and other functions by installing a profile point marker or agent into methods of the application 110.

In one embodiment of the invention, the profiler includes a module, such as module 140, to make a determination when and where to place profile points. When operational conditions warrant, profile points may be placed in methods as needed. As shown in the figure, a profile point 130 is placed in method A 120 and a profile point 135 is place in method B 125. In the embodiment, the profile points generate events for the profiler 115 whenever the method is entered or exited. In one embodiment, the profile points may be turned on or off as needed for profiling an application.

Figure 2:
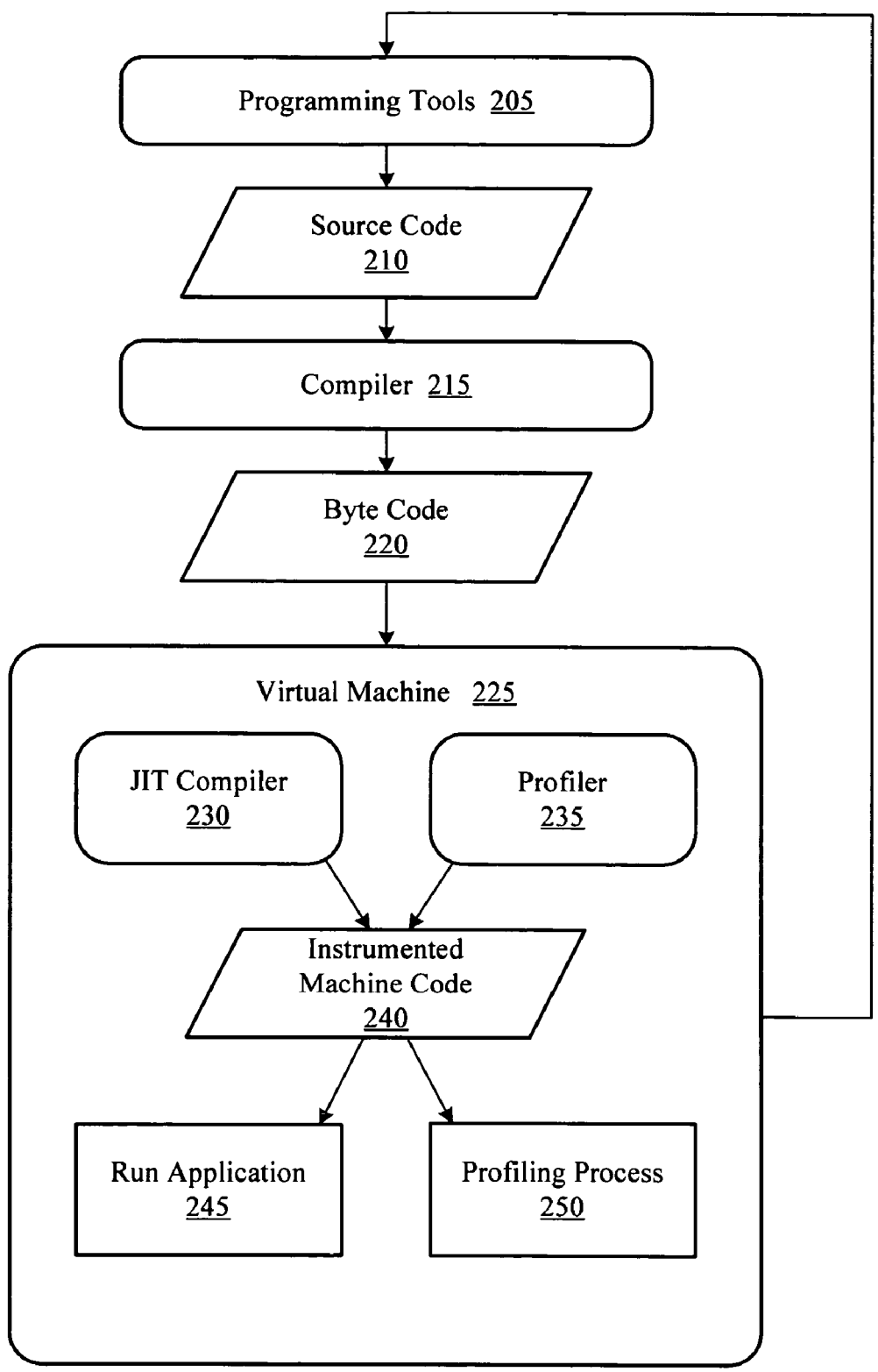
FIG. 2 is an illustration of profiling operations in an embodiment of the invention.

FIG. 2 is an illustration of profiling operations in an embodiment of the invention. In this illustration, a developer utilizes certain programming tools 205 (which may be as simple as a text editor program) to generate source code 210 for an application. The application may be developed in any language, including Java. In this embodiment, the source code 210 is compiled into byte code 220, which is an intermediate and machine independent code for Java systems. The byte code 220 is sent to a virtual machine 225 for operation.

In an embodiment of the invention, the virtual machine includes a just-in-time compiler 230 for converting the byte code into machine code and a profiler 235, which may be utilized in profiling operations. In an embodiment, the profiler 235 will place profile points in the formation of instrumented machine code. In the running 240 of the application, there may be a profiling process 250, including the collection of data regarding events generated for any method entry or exit for the application. As a result of the profiling results, the application may be modified in a return to the development of the application 205.

Figure 3:
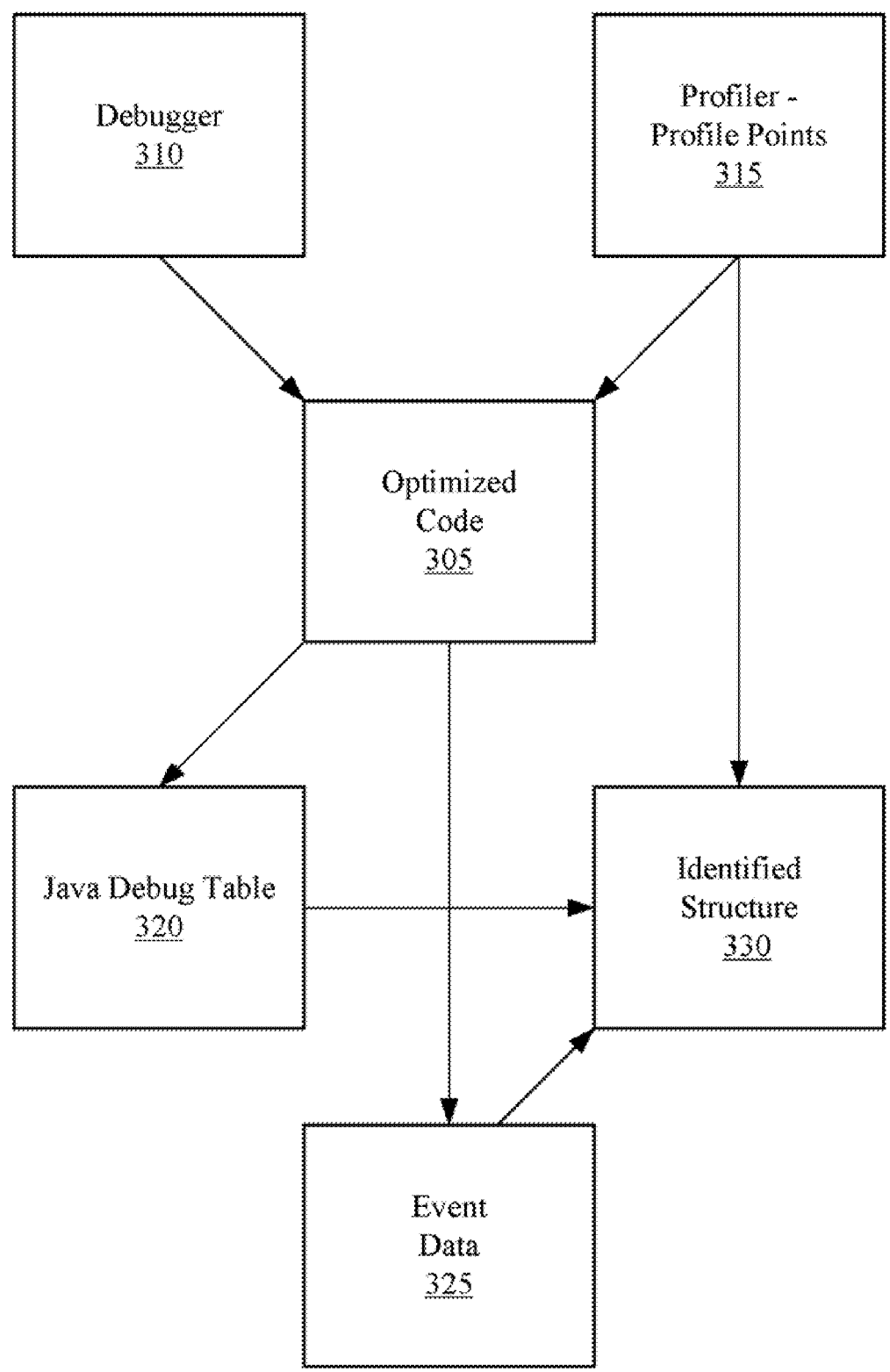
FIG. 3 is an illustration of an embodiment of a profiling system.

FIG. 3 is an illustration of an embodiment of a profiling system. In this illustration, optimized application code 305 is to be run. The running of the application may include the use of certain conventional processes, such as a debugger 310. In addition, a profiler 315 may install agents (profile points) in the optimized code 305, the profile points providing signals or events whenever a method in the optimized code 305 is entered or exited. In one embodiment, the profile points may be turned on or off as needed to collect required data.

The running of the optimized code 305 results in debugging data, which may, for example be in the form of a debugging table 320, such the debugging table generated in running a Java application. In addition, data may be collected regarding the events that have been generated upon the entry into or exit from methods 325. The profiler 315 may then use the debug table 320 and the collected event data 325 to identify information regarding the application process 330, which is intended to discern problems in the code 305 that can be corrected.

Figure 4:
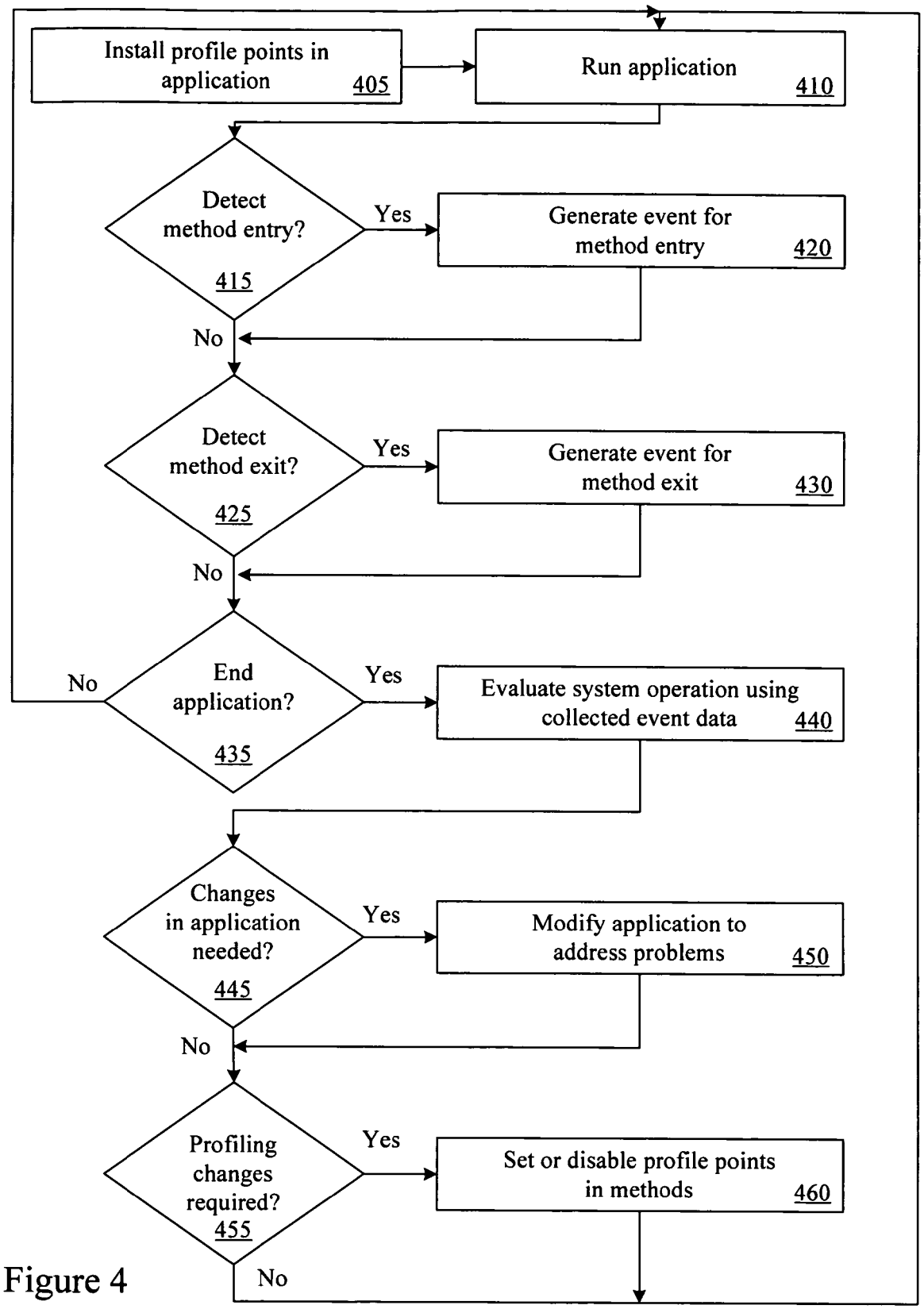
FIG. 4 is a flowchart to illustrate an embodiment of profiling of computer applications.

FIG. 4 is a flowchart to illustrate an embodiment of profiling of computer applications. In this illustration, agents for profiling (profile points) are installed in the methods of an application 405. The profile points are intended to detect when the relevant method is entered or exited. The profile points may be either active or inactive, depending on profiling needs. In an embodiment of the invention, the profile points do not interrupt the operation of the application.

The profiled application is then run 410. During the running of the application, if a method is entered 415, an event is generated and data regarding the event is stored 420. If a method is exited 425, an event is generated and data regarding the event is stored 430. When the application run is terminated 435, whether by normal operation, by failure, or other reason, an evaluation may be made using the collected event data 440. For example, the CPU usage involved in any method may be determined using comparisons of entry times and exit times. If the evaluation of the data indicated that changes in the application are needed, a developer may modify the application code, and recompile the code as needed.

In addition, the profiler may determine whether changes in profiling are needed 455. For example, the active profile points may not be collecting the needed data, or too much extraneous data may be collected. If needed, profiling points may be set or disabled 460. In an embodiment of the invention, the changes in profiling may be made without recompiling the application.

Figure 5:
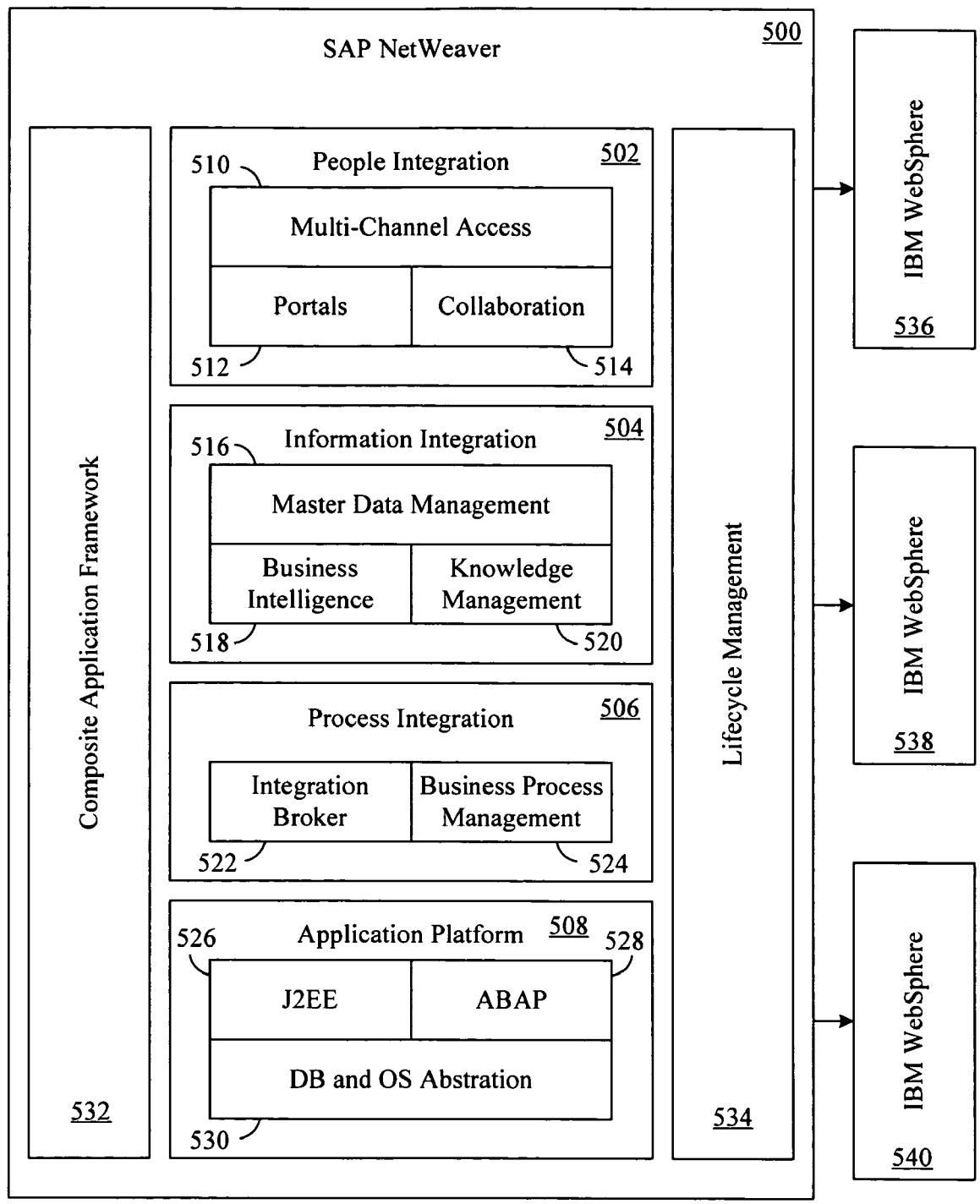
FIG. 5 is a diagram illustrating an embodiment of a system architecture.

FIG. 5 is a diagram illustrating an embodiment of a system architecture. In one embodiment, the diagram illustrates core components of the SAP NetWeaver architecture 500, in which a web service interface for external management may be implemented. The system architecture 500 comprises various SAP platforms that are merged together to provide the integration of people, information, and processes in one solution. The architecture 500 includes people integration 502, information integration 504, process integration 506, and an application platform 508.

People integration 502 is performed using a portal solution 512 and a platform to work in collaboration 514. Users are provided a multi-channel access 510 to ensure mobility. Examples of the portal solution 512 include SAP Enterprise Portal, SAP Mobile Engine, and Collaboration Package for SAP Enterprise Portal. Information integration 504 refers to the conversion of information into knowledge. Information integration 504 provides efficient business intelligence 518 and knowledge management 520 using, for example, SAP products such as Business Information Warehouse (BW) and Knowledge Management (KM). Further, consolidation of master data management beyond system boundaries is performed using SAP's Master Data Management (MDM) 516. Process integration 506 refers to optimized process management using integration broker or SAP exchange infrastructure 522 and business process management 524 techniques. Examples of products to perform process integration 506 include Exchange Infrastructure (XI) and Business Process Management (BPM).

An application platform 508 may include SAP's Web Application Server (Web AS), which is the basis for SAP applications. Web AS, which may be independent of the database and operating system 530, includes a J2EE engine 526 in combination with the proprietary ABAP (Advanced Business Application Programming) engine or instance 528 to further enhance the application platform 508. In one embodiment, the application platform 508 includes operation of a web service to provide an interface for heterogeneous external clients to manage systems provided by the application platform 508. In one embodiment, the web service may act as a framework to connect client agents to the application platform.

The architecture 500 further includes a composite application framework 532 to provide various open interfaces (APIs) and a lifecycle management 534, which is an extension of a previously existing transport management system (TMS). As illustrated, the architecture 500 further provides communication with Microsoft.NET 536, International Business Machine (IBM) WebSphere 538, and other such systems 540.

Figure 6:
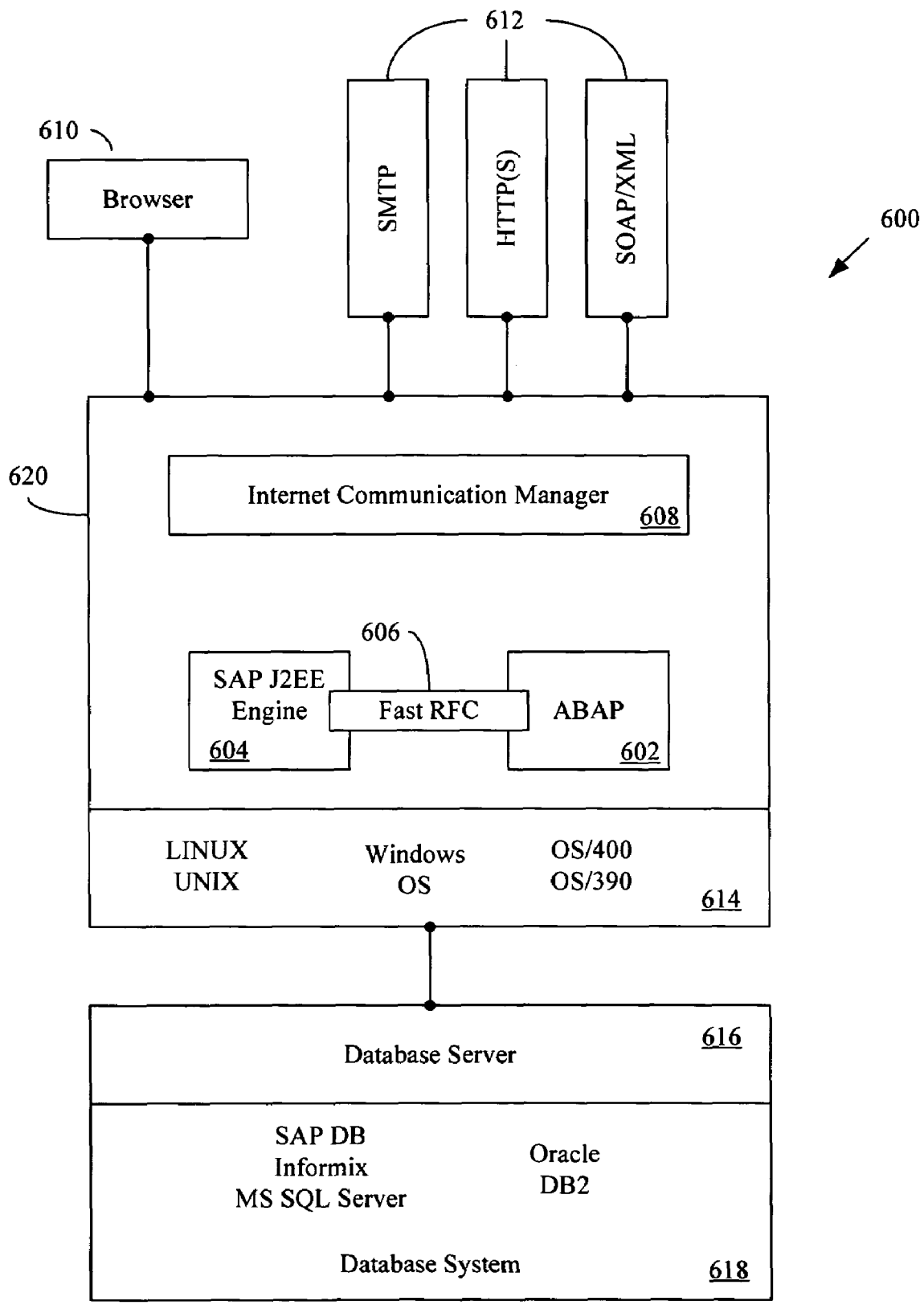
FIG. 6 is a block diagram illustrating an embodiment of an architecture including a Web Application Server.

FIG. 6 is a block diagram illustrating an embodiment of an architecture including a Web Application Server. In this illustration, an architecture 600 serves as an application platform (which may be, for example, the application platform 508 of provided in FIG. 2) for SAP NetWeaver and other SAP products. The architecture 600 includes a Web AS 620 having an ABAP program engine 602, which provides the ABAP development and runtime environment, with the dependability, scalability, and inter-process independence of operating systems 614 and database systems 618. The operating system 614 may include LINUX, UNIX, Windows, OS/390, OS/400, and other such operating systems. The database system 618 may include SAP database (SAP DB), Informix, Oracle, DB2, and other such database systems. The database system 618 is based on a database server 616, such as Microsoft Sequential Query Language (MS SQL) server.

The Web AS 620 with ABAP engine 602 further includes a J2EE program engine 604. The J2EE may support one or more program instances. The J2EE engine 604 is in communication with the ABAP engine 602 via a fast Remote Function Call (RFC) connection 606. The ABAP engine 602 and the J2EE engine 604 are further in communication with an Internet Communication Manager (ICM) 608. The ICM 608 is provided for handling and distributing queries to various individual components of the architecture 600. The architecture 600 further supports a browser 610, such as Microsoft Internet Explorer, Netscape Navigator, and other modified variations of mobile end devices, such as personal digital assistants (PDAs), pocket computers, smart cell phones, other hybrid devices, and the like. The Web AS 620 also supports various protocols and standards 612, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 612 include SOAP and XML for the operation of web service to provide an interface for external management of systems on the Web AS 620.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
    installing a plurality of profile agents in a computer application with a profiler, the computer application being stored in a computer memory and including a plurality of program objects, each of the profile agents being set in an initialization method for one of the plurality of program objects, the profile agents being inserted during compilation of byte code for the computer application, wherein each profile agent generates an event when there is an entry into the respective initialization method or an exit from the initialization method;
    subsequent to inserting the profile agents during compilation of the byte code for the computer application, receiving a notification from a server regarding excessive memory usage by the computer application;
    switching on one or more of the profile agents with the profiler in response to the notification, wherein the one or more profile agents are switched on by the profiler without recompiling the computer application;
    running the computer application including the one or more profile agents using one or more processors;
    monitoring for events generated by the one or more profile agents during the running of the computer application;
    identifying one or more program objects causing the excessive memory usage based on the events generated by the one or more profile agents; and
    switching the one or more profile agents off, wherein the one or more profile agents are switched off without recompiling the computer application or removing the one or more profile agents from the computer application.

2. The method of claim 1, wherein the computer application is optimized prior to installation of the one or more profile agents by the profiler.

3. The method of claim 1, wherein the one or more profile agents do not block the operation of the computer application.

4. The method of claim 1, wherein identifying the one or more program objects causing excessive memory usage includes determining the location in the program code at which the one or more program objects were allocated.

5. The method of claim 1, wherein the computer application is a Java™ application.

6. The method of claim 5, wherein the one or more profile agents operate on one or more Java interfaces to the computer application.

7. A computer application profiling system comprising:
    a computer memory, the computer memory including a computer application including a plurality of program objects;
    a central processing unit (CPU), the CPU to compile and execute the computer application;
    a first module to insert a plurality of profile agents into initialization methods for the program objects of the computer application during compilation of byte code for the computer application, the plurality of profile agents to detect when there is an entry into or exit from the respective initialization method methods and to generate a signal when a method entry or exit is detected; and
    a second module to identify a problem area in the computer application having excessive memory usage, wherein the profiling system is to turn one or more of the profile agents on to monitor method entry or exit in response to identification of the memory problem, wherein the one or more profile agents are turned on by the profiling system without recompiling the computer application;
    wherein the profiling system is to identify one or more program objects causing the excessive memory usage based on signals generated by the one or more profile agents; and
    wherein the profiling system is to turn the one or more profile agents off, the one or more profile agents being turned off without recompiling the computer application or removing the one or more profile agents from the computer application.

8. The profiling system of claim 7, wherein data regarding the signals generated is stored in the memory.

9. The profiling system of claim 7, wherein the second module identifies the problem areas based at least in part on debugging data contained in a debug table that is generated for the computer application during compilation of the computer application.

10. The profiling system of claim 7, wherein the plurality of program objects do not interrupt the execution of the computer application.

11. The profiling system of claim 7, wherein the profiling system is to determine an execution time for an initialization method by subtracting a time of entry for a method from a time of exit for the method.

12. A computer-readable medium having stored thereon data representing sequences of instructions that, when executed by a processor, cause the processor to perform operations comprising:

installing a plurality of profile agents in initialization methods for a plurality of program objects of a computer application using a profiler, the profile agents being inserted during compilation of byte code for the computer application, wherein each profile agent generates a message when there is an entry into the respective initialization method or an exit from the initialization method;

subsequent to inserting the profile agents during compilation of the byte code for the computer application, receiving a notification from a server regarding excessive memory usage for the computer application;

switching on one or more of the profile agents with the profiler in response to the notification, wherein the one or more profile agents are switched on by the profiler without recompiling the computer application;

running the computer application;

storing data regarding any messages generated by the one or more profile agents during the running of the computer application;

identifying one or more program objects causing the excessive memory usage based on the events generated by the one or more profile agents; and switching the one or more profile agents off, wherein the one or more profile agents are switched off without recompiling the computer application or removing the one or more profile agents from the computer application.

13. The medium of claim 12, wherein the computer application comprises optimized code prior to the insertion of the plurality of profile agents.

14. The medium of claim 12, wherein the computer application is a Java™ application.

15. The method of claim 5, wherein the profiler works in conjunction with a debug table generated during compilation of the Java computer program.

16. The method of claim 15, wherein the profiler obtains parameters from the debug table to assist in identifying computer application problems.

17. The profiling system of claim 7, wherein the profiling system includes a dynamic link library (DLL).

18. The profiling system of claim 7, wherein the computer application is capable of allocating memory without limitation.

* * * * *